US009752605B2

(12) United States Patent
Papadopoulos

(10) Patent No.: US 9,752,605 B2
(45) Date of Patent: Sep. 5, 2017

(54) LOAD RELEASE MEANS FOR TELESCOPIC PROPS

(71) Applicant: Brand Energy & Infrastructure Services LTD, Leatherhead (GB)

(72) Inventor: Demetrios Georgiou Papadopoulos, Hounslow (GB)

(73) Assignee: Brand Energy & Infrastructure Services LTD, Leatherhead (GB)

( * ) Notice: Subject to any disclaimer, the term of this patent is extended or adjusted under 35 U.S.C. 154(b) by 0 days.

(21) Appl. No.: 14/781,212

(22) PCT Filed: Apr. 11, 2014

(86) PCT No.: PCT/GB2014/000141
§ 371 (c)(1),
(2) Date: Sep. 29, 2015

(87) PCT Pub. No.: WO2014/167274
PCT Pub. Date: Oct. 16, 2014

(65) Prior Publication Data
US 2016/0032953 A1     Feb. 4, 2016

(30) Foreign Application Priority Data
Apr. 12, 2013  (GB) .................................. 1306649.3

(51) Int. Cl.
*A47F 5/00*  (2006.01)
*E04G 25/00*  (2006.01)
(Continued)

(52) U.S. Cl.
CPC .............. *F16B 7/06* (2013.01); *E04G 25/065* (2013.01); *F16B 7/182* (2013.01); *F16B 33/02* (2013.01);
(Continued)

(58) Field of Classification Search
CPC ................................ E04G 25/06; E04G 25/04
(Continued)

(56) References Cited

U.S. PATENT DOCUMENTS 2,584,015 A  1/1952  Hawes
3,603,552 A  9/1971  Wheelock
(Continued)

FOREIGN PATENT DOCUMENTS

AT      375 621 B    1/1984
BE      518 912 A    4/1953
(Continued)

OTHER PUBLICATIONS

International Application No. PCT/GB2014/000141, dated Apr. 11, 2014.
(Continued)

*Primary Examiner* — Terrell McKinnon
*Assistant Examiner* — Michael McDuffie
(74) *Attorney, Agent, or Firm* — Wolf, Greenfield & Sacks, P.C.

(57) ABSTRACT

A load release means for a telescopic prop, the load release means comprising: an inner member with at least one threaded portion; a striking collar with threaded internal bore configured to threadedly engage with the threaded portion of the inner member through a thread interface; and, locking means to releasably secure said striking collar on said inner member, whereby, in use, when an applied load V acts directly on the thread interface, the component force S of the applied load V provides most or all of the striking torque such that when the locking means is released little to no external torque is required to be applied to the striking collar to strike the striking collar.

20 Claims, 7 Drawing Sheets

(51) Int. Cl.
*F16M 13/00* (2006.01)
*F16B 7/06* (2006.01)
*E04G 25/06* (2006.01)
*F16B 33/02* (2006.01)
*F16B 7/18* (2006.01)
*F16B 39/16* (2006.01)
*F16M 11/26* (2006.01)
*F16B 5/02* (2006.01)

(52) U.S. Cl.
CPC ............. *F16B 39/16* (2013.01); *F16M 11/26* (2013.01); *F16B 5/0275* (2013.01)

(58) Field of Classification Search
USPC ....... 248/188.2, 188.4, 188.5, 188.8, 188.91, 248/295.11, 354.1, 354.3, 354.6
See application file for complete search history.

(56) References Cited

U.S. PATENT DOCUMENTS

| | | | | |
|---|---|---|---|---|
| 4,234,151 A * | 11/1980 | John | ................ | E04G 25/06 248/354.3 |
| 5,056,753 A * | 10/1991 | Lunau | ................ | A47K 17/02 248/200.1 |
| 5,400,994 A * | 3/1995 | Shawwaf | ................ | E21D 15/22 248/354.3 |
| 5,588,264 A * | 12/1996 | Buzon | ................ | E04D 11/007 108/150 |
| 6,024,330 A * | 2/2000 | Mroz | ................ | F16M 7/00 248/188.4 |
| 6,142,431 A * | 11/2000 | Herzog | ................ | A47B 91/024 248/188.4 |
| 6,499,916 B2 * | 12/2002 | Marianski | ................ | E21D 15/02 248/354.3 |
| 7,584,932 B2 * | 9/2009 | Shih | ................ | E04G 17/14 248/125.2 |
| 7,921,612 B2 * | 4/2011 | Knight, III | ................ | B23Q 1/0054 248/188.4 |
| 8,851,305 B2 * | 10/2014 | Didehvar | ................ | A47H 1/022 211/105.4 |
| 2012/0074273 A1 * | 3/2012 | Liu | ................ | F16B 5/0233 248/188.4 |
| 2012/0152874 A1 * | 6/2012 | Didehvar | ................ | A47K 3/38 211/105.4 |
| 2013/0240701 A1 * | 9/2013 | Marks | ................ | F16M 7/00 248/295.11 |
| 2013/0319795 A1 * | 12/2013 | So | ................ | E04G 5/001 182/129 |

FOREIGN PATENT DOCUMENTS

| | | |
|---|---|---|
| DE | 867 981 C1 | 2/1953 |
| DE | 2 206 351 A1 | 8/1973 |
| DE | 195 03 299 A1 | 8/1996 |
| GB | 2 271 802 A | 4/1994 |

OTHER PUBLICATIONS

International Application No. GB1306649.3, dated Sep. 26, 2013.
International Application No. GB1415924.8, dated Jul. 6, 2015.

* cited by examiner

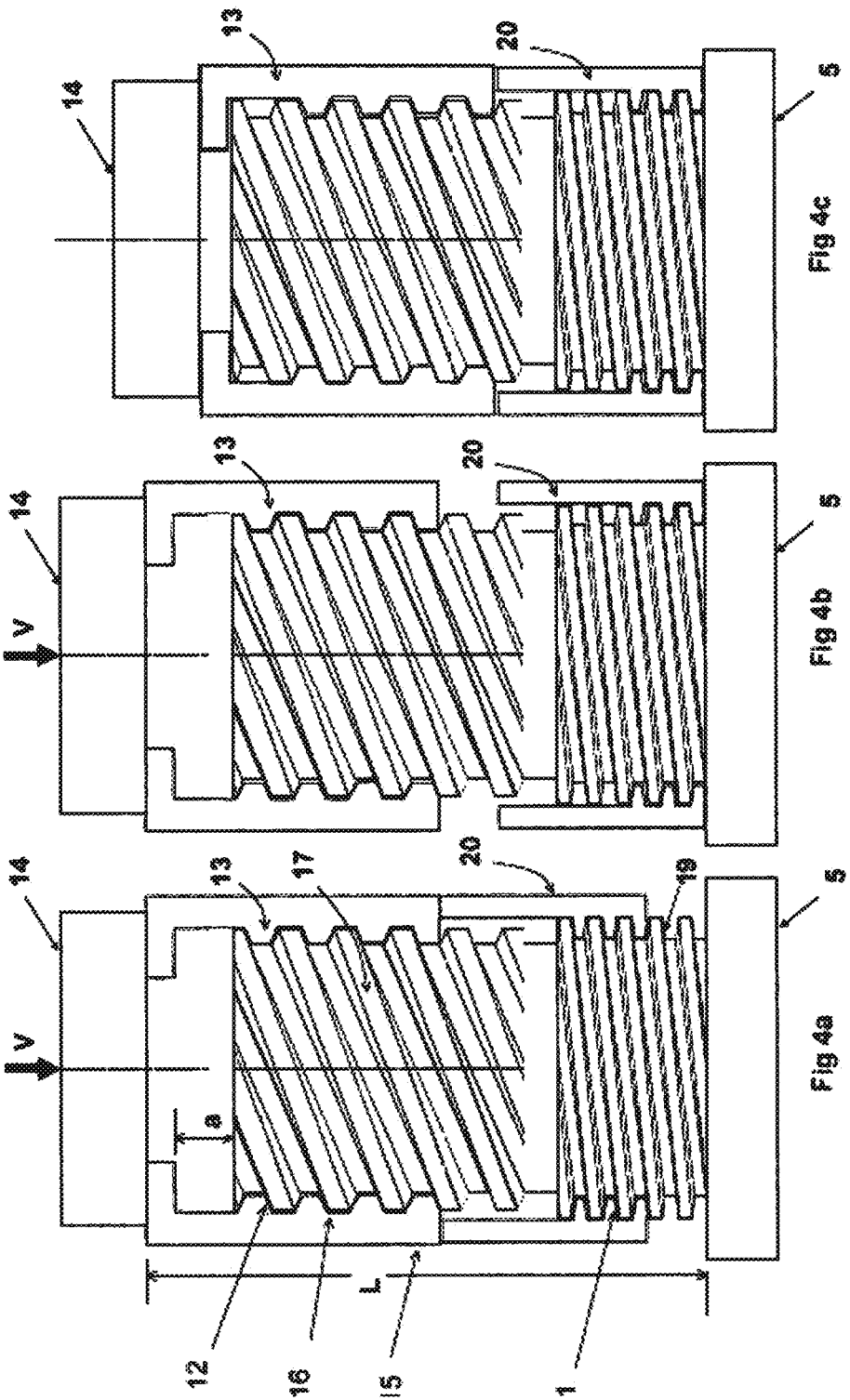

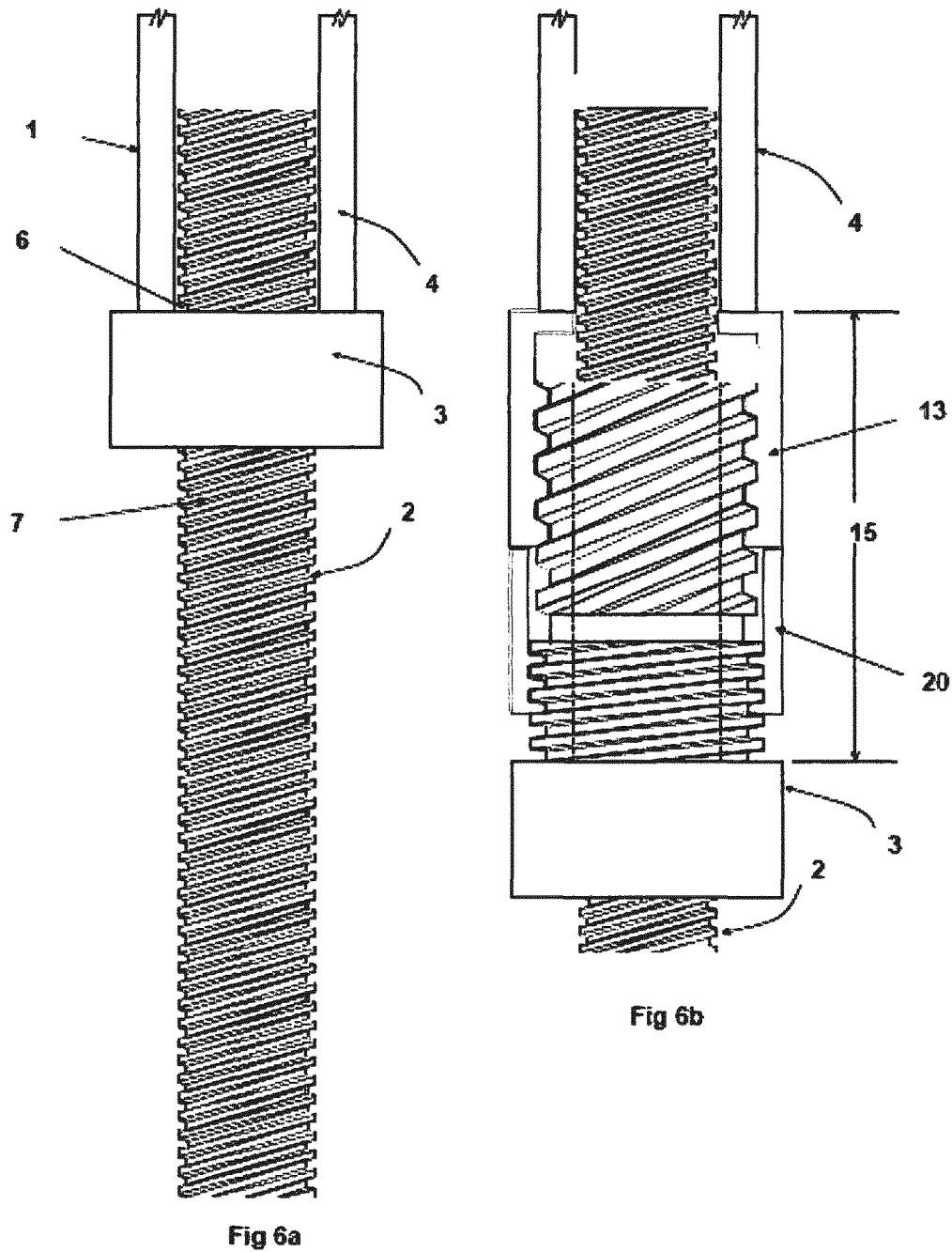

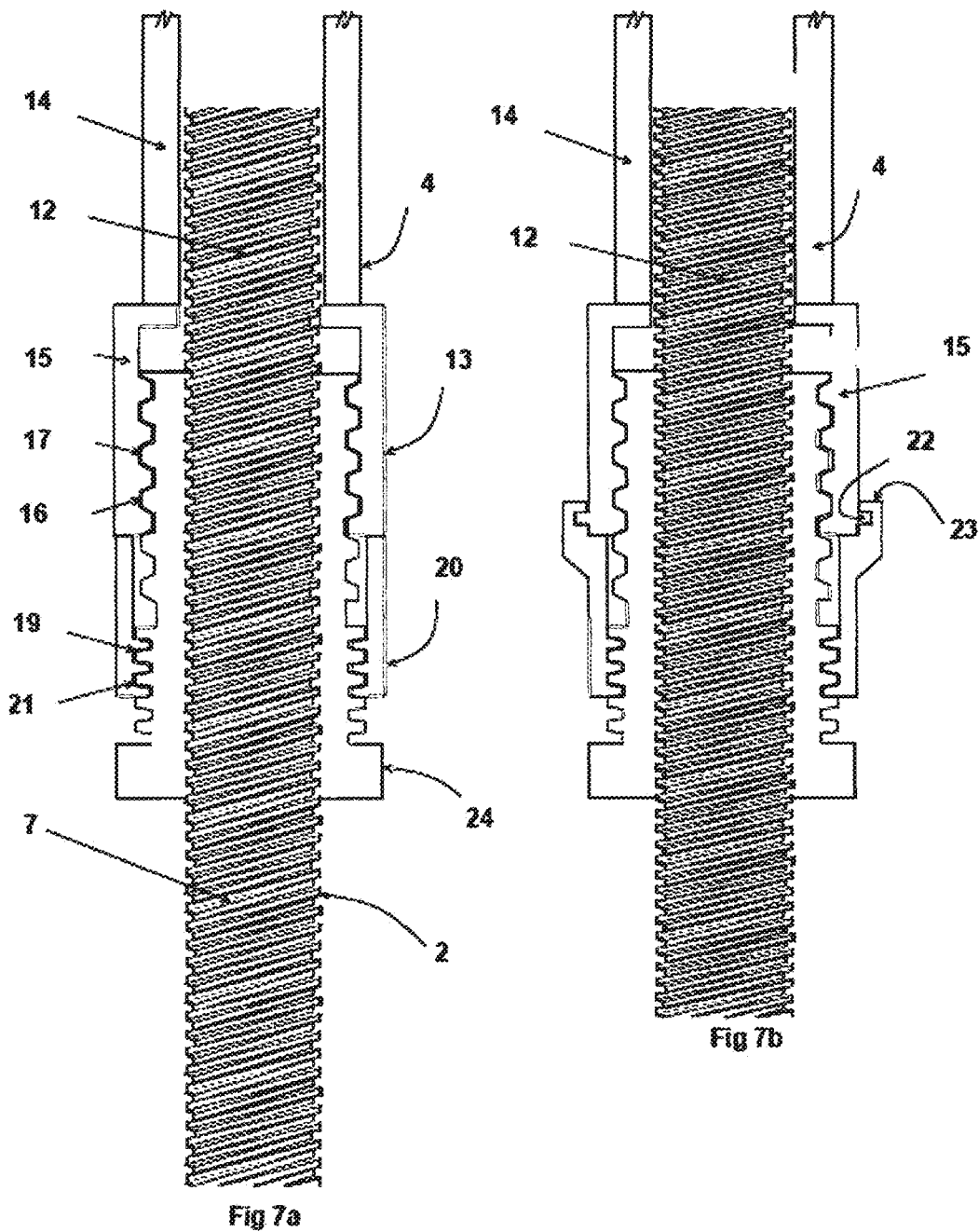

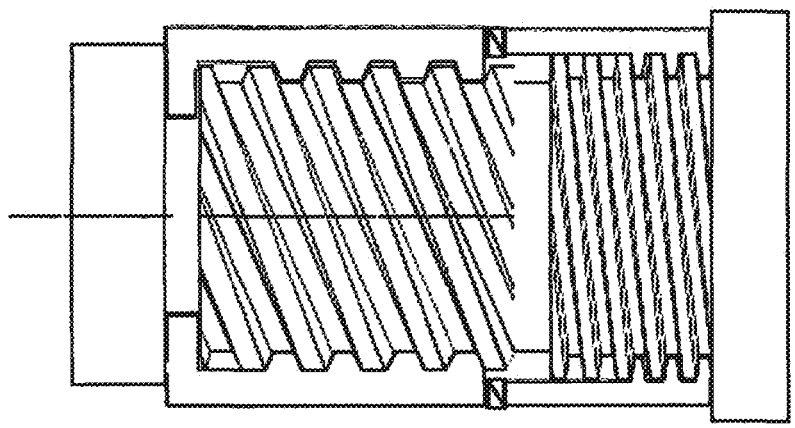
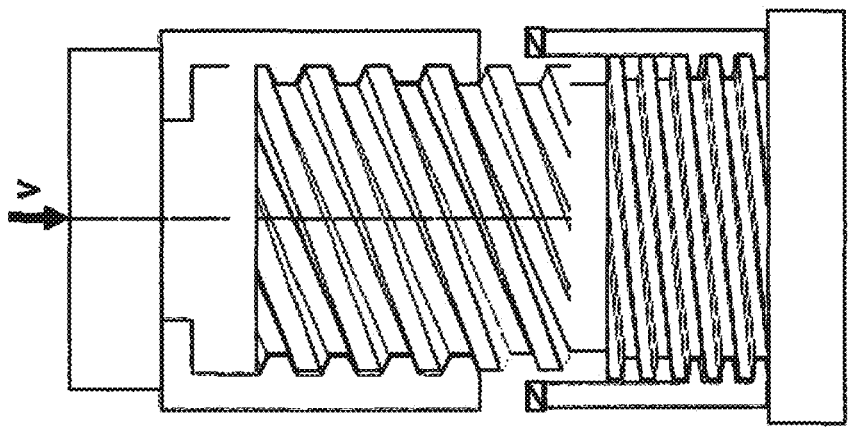
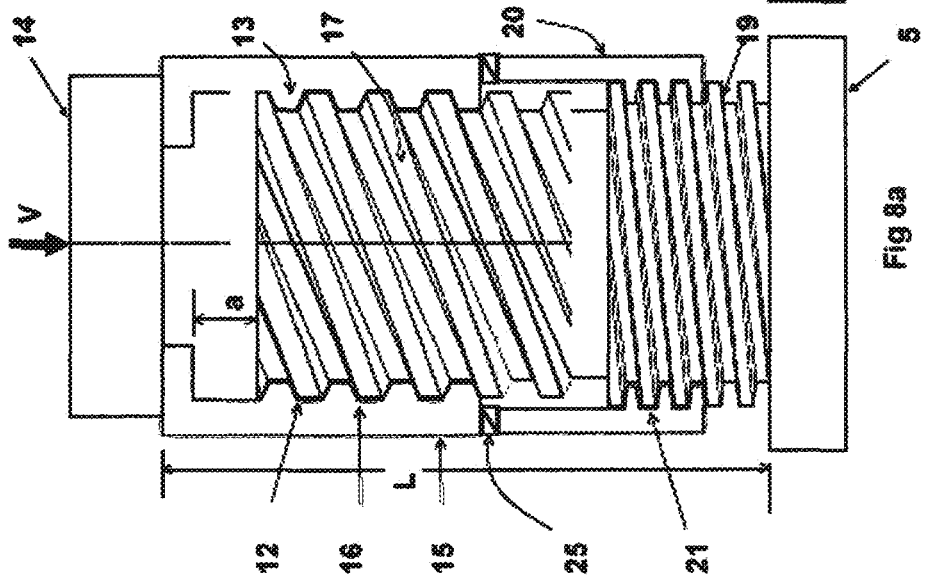

LOAD RELEASE MEANS FOR TELESCOPIC PROPS

RELATED APPLICATIONS

This application is a national stage filing under 35 U.S.C. §371 of International Application PCT/GB2014/000141, filed Apr. 11, 2014, entitled "IMPROVEMENTS IN LOAD RELEASE MEANS FOR TELESCOPIC PROPS". International Application PCT/GB2014/000141 claims priority to International Application GB 1306649.3, filed Apr. 12, 2013, the contents of which are both herein incorporated by reference in their entireties.

This invention pertains generally to the field of telescopic props and in particular load release means for telescopic props.

Telescopic props are widely used in scaffolding and for all kinds of formwork within the construction industry to support a wall, roof, slab, beam, column or other structure in position during the construction process. These props are typically temporary supports, and are therefore not an integral part of the structure being supported.

A telescopic prop typically comprises two concentric members; an outer member, typically a tube, and an inner member, known as an inner leg or jack. The inner member is configured to slide telescopically within the outer member in order to adjust the overall length of the prop. The inner member and outer member are telescoped to approximately the right length. Many of these telescopic props incorporate a collar or nut with a threaded internal bore. This collar is configured to engage with a threaded portion about the circumferential surface of the inner member. The outer member comprises a bore which is slightly larger than the outer diameter of the inner member, and this outer member is placed over the inner member such that its lower end engages with the collar. Rotation of the collar moves the outer member in relation to the inner member, thereby adjusting the overall length of the prop. These props may comprise pins and slots allowing for rapid adjustment of the overall length of the prop.

Problems arise when the prop is no longer required and needs to be removed; a process known as striking. Striking is defined as the action of unloading and dismantling temporary construction components, such as telescopic props, to facilitate removal of these components. Typically, telescopic props are under considerable compression load. Difficulty is often experienced when trying to rotate the collar to shorten the length of the prop and release the load so that the prop can be removed. Each prop can support considerable loads, in some cases this can be in excess of 14 tonnes.

The interface between the outer member and the collar, and between the threads of the inner bore of the collar and the corresponding threads of the inner member, are where the load is supported. This load creates substantial frictional resistance when attempting to rotate the collar about the inner member, so that considerable external torque needs to be applied to facilitate this rotation. In addition to this, the longitudinal strain induced in the prop may be of such magnitude that the collar may have to be rotated through many degrees of revolution, again requiring considerable external torque to release the load and strike the prop.

Over the years a number of mechanisms have been proposed to assist with the striking process. The majority of these propose a means of suddenly releasing a load and therefore suddenly striking a prop. This can cause problems in adjacent props, where more than one prop has been erected to support a structure, as the load from the struck prop is transferred to these adjacent props. This may have an adverse affect on the structure being supported.

The prior art shows a number of devices which address this need in various ways.

GB2357806 discloses a load bearing prop with telescopic support shaft, comprising a hydraulic control mechanism for controlling the relative telescopic movement of the support members. Whilst providing a means of controlling the release of the load upon striking, the addition of the hydraulic control mechanism adds considerably to the unit cost for what is essentially a commodity item. There are also issues with the need for hydraulic oil within the system, and particularly when used within some of the adverse environments in which these props are often installed.

GB878825 discloses an hydraulic telescopic pit prop that is provided in its upper end with a spring-pressed rod, whereby on release of the prop the spring overcomes the initial friction and resistance to assist with collapsing of the prop. Again this means of controlling the release adds considerable unit cost through integration of the hydraulic mechanism.

GB2271802 discloses a scaffolding prop of telescopic form. The prop comprises an inner element in the form of a tube that is slidable telescopically within an outer tube. The inner tube is provided with a plurality of diametrically opposed apertures, and the outer tube is provided with two opposed apertures of elongate form. A pin is provided to pass through the apertures to fix the prop to the required length. This document identifies the problem of rotating the collar under substantial loads. However it does not address the issue of sudden release of the load.

GB2127886 discloses a drop-head prop with stripping means positioned between a pin and a nut, whereby rotation of the stripping means acts to gradually lower the head plate. The stripping device may comprise two identical components each having a flat surface and a shaped, alternate concave and convex surface, placed together with their shaped surfaces touching each other. This therefore allows the device to be moved between two positions. This provides a means of somewhat gradual release of the load before the prop is struck, thus preventing shock to the cast concrete. The concave and convex surfaces allow for this somewhat controlled release, however the release is still not under much control, with the device being movable between two positions, and the two parts have to be rotated on their flat faces whilst supporting the load.

Whilst the prior art appears to address the issue of striking of props, and the ease with which it can be achieved by a labourer, none of the prior art proposes a way of considerably reducing the effort required to strike the prop for removal from the structure that it is supporting. None of the prior art found also incorporates a means to gradually and in a controlled way release the load acting on the prop, without adversely affecting the structure or the surrounding props.

Preferred embodiments of the present invention aim to provide a load release means for a telescopic prop that allows for minimal effort to be required to strike the prop, whilst also providing means for the controlled and gradual release of the prop from the structure that it supports.

According to one aspect of the present invention, there is provided a load release means for a telescopic prop, the load release means comprising:
an inner member with at least one threaded portion;
a striking collar with threaded internal bore configured to threadedly engage with the threaded portion of the inner member through a thread interface; and locking means to releasably secure said striking collar on said inner member, whereby, in use, the thread interface is configured such that when an applied load V acts directly on the thread interface, the component force S of the applied load V provides most or all of the striking torque such that when the locking means is released little to no external torque is required to be applied to the striking collar to strike said striking collar.

Preferably, the locking means is a retention collar with threaded internal bore configured to engage with a second threaded portion of the inner member, whereby, in use, the retention collar releasably secures the striking collar in position.

The striking collar and the retention collar may be releasably joined to each other, whereby rotation of said retention collar rotates the striking collar on their respective threaded portions.

Preferably, the striking collar may incorporate at least one protrusion configured to engage with at least one recess in the retention collar at the interface between the striking collar and the retention collar.

Alternatively, the retention collar may incorporate at least one protrusion configured to engage with at least one recess in the striking collar at the interface between the retention collar and the striking collar.

Preferably, the at least one protrusion comprises a continuous lip, and the at least one recess comprises a continuous groove.

The threaded internal bore of the striking collar and corresponding threaded portion of the inner member may comprise a single start thread.

Alternatively, the threaded internal bore of the striking collar and corresponding threaded portion of the inner member may comprise a multiple start thread.

Preferably, when the locking means is released, the component force S is greater than the frictional force F, and the striking collar self-strikes.

The striking collar and the retention collar may be separated by a compliant material.

The compliant material may comprise at least one spring washer.

The striking collar and the retention collar may be separated by a low friction material.

The low friction material may be PTFE.

The compliant material may alternatively be incorporated alongside the low friction material.

The striking collar may incorporate at least one handle to facilitate rotation of said striking collar.

The retention collar may incorporate at least one handle to facilitate rotation of said retention collar.

The striking collar may incorporate at least one circumferential groove to support an outer member that is telescopically received on the striking collar, preventing separation under tension of said outer member to said striking collar.

Alternatively, the locking means may comprise at least one cam arrangement secured to said inner member, whereby, in use, the at least one cam arrangement releasably secures the striking collar in position.

The threaded portion of the inner member and the corresponding threaded bore of the striking collar may be configured with a helix angle greater than a critical helix angle for the specific thread, whereby in use, when the locking means is released, the striking collar rotates and self-strikes.

The inner member may comprise a threaded bore to threadedly engage with an inner leg of the telescopic prop for adjusting the height of the telescopic prop.

Alternatively, the inner member may comprise a tube with a diameter greater than the outer diameter of the inner leg of the telescopic prop for retrofitting on to an adjusting collar of the inner leg of the telescopic prop.

For a better understanding of the invention and to show how embodiments of the same may be carried into effect, reference will now be made, by way of example, to the accompanying diagrammatic drawings, in which:

FIGS. 4a, 4b, 4c show one example of an embodiment of the load release means when supporting a load V (FIG. 4a), during the striking process (FIG. 4b) and having been struck (FIG. 4c);

FIGS. 6a and 6b show a further embodiment of the load release means when retrofitted at the collar of an existing telescopic prop;

FIG. 7a shows a further embodiment of the load release means incorporated with and an integral part of a conventional telescopic prop collar;

FIG. 7b shows the load release means of FIG. 7a when the striking and retention collars are releasably secured to each other; and, FIGS. 8a, 8b, 8c show the load release means incorporating a compliant material between the striking collar and the retention collar.

In the figures like references denote like or corresponding parts.

Figure 1:
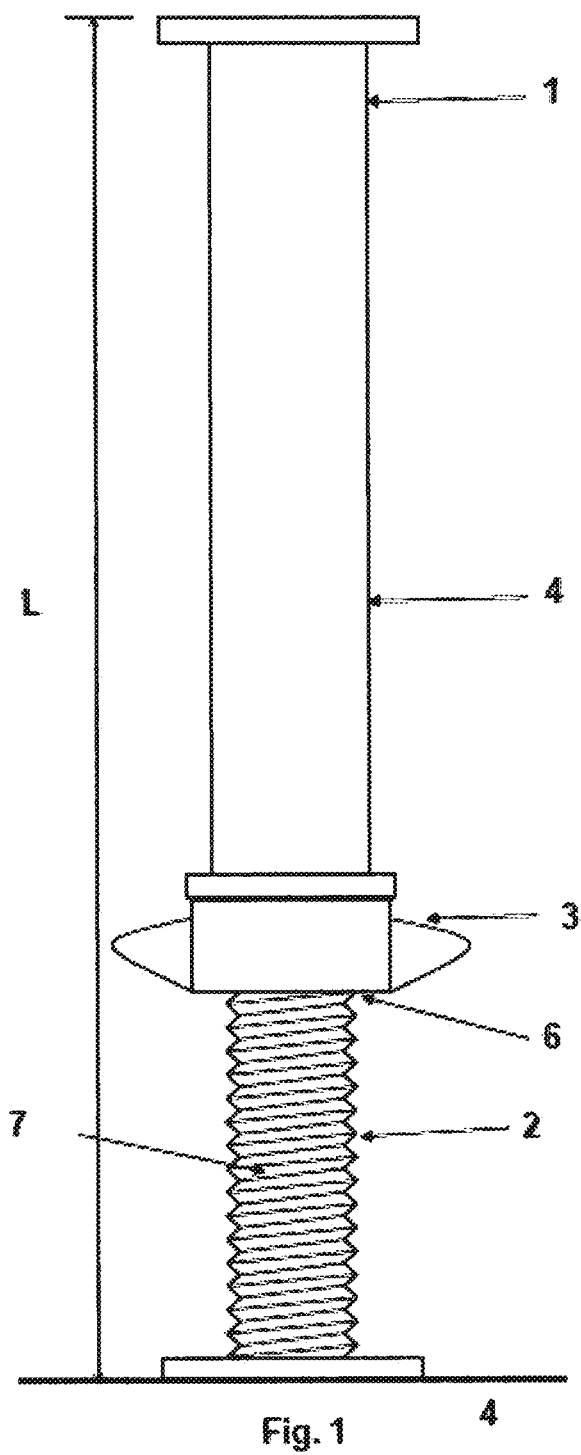
FIG. 1 shows a conventional telescopic prop of the prior art.

As shown in FIG. 1 a typical telescopic prop 1 comprises of mainly three elements. The inner leg 2 with a threaded portion of the inner leg 7, is an element partially or wholly threaded along its outer perimeter. A nut or collar 3 comprises an element with an internal threaded bore 6 such that it may be threadedly engaged on the threaded portion 7 of the inner leg 2. An outer leg 4, provided with a bore which is slightly larger than the outer diameter of the inner leg 2 and is placed over the inner leg 2 such that its lower end engages with the upper part or face of the collar 3. The arrangement is such that rotation of the collar 3 will increase or decrease the overall length L of the telescopic prop 1 shown in FIG. 1 depending on the direction in which the collar 3 is turned. Such telescopic props 1 may incorporate additional elements and/or features such as pins and slots (not shown), which facilitate the rapid adjustment of the overall length L.

Figure 2:
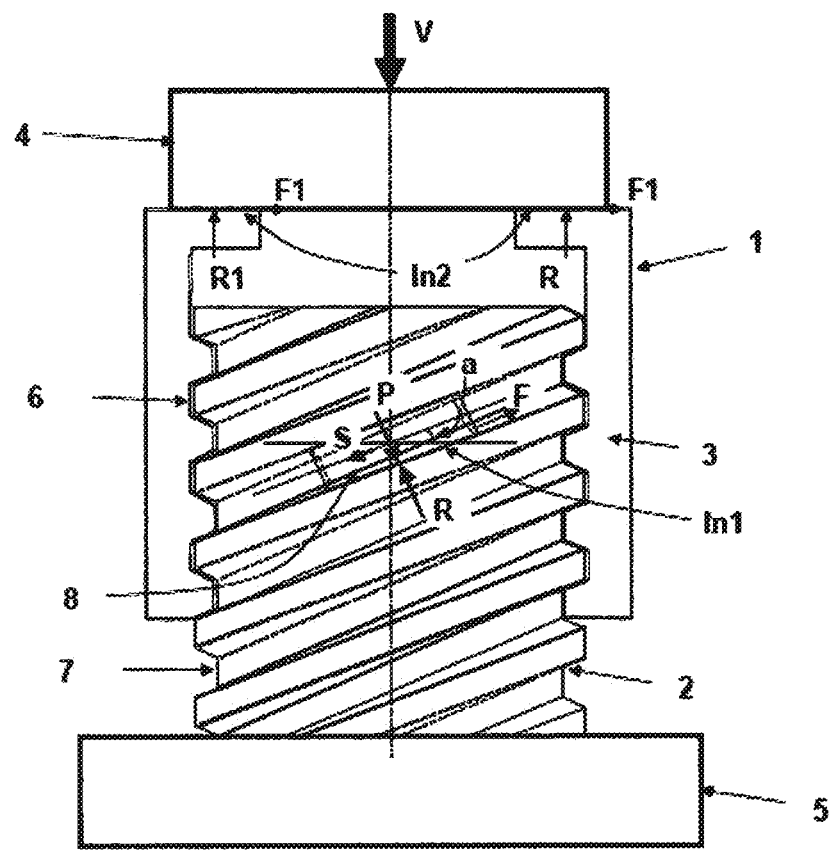
FIG. 2 shows the interaction of forces of the telescopic prop of FIG. 1 at the mating surfaces with applied load, under compression load V.

FIG. 2 shows a diagrammatic view of the forces acting on a threaded portion 7 of the inner leg 2 of the conventional telescopic prop 1. The threaded internal bore 6 of the collar 3 is also subject to resultant forces of the applied load V, equivalent to the resultant forces acting on the threaded portion 7 of the inner member 2. The common interface between the threads of the threaded portion 7 of the inner leg 2 and the respective threads of the threaded internal bore 6 of the collar 3 are subject to reaction forces, frictional forces, in addition to applied and resistive torques. The applied load V is an axial load. The threaded portion 7 and corresponding threaded internal bore 6, is essentially an inclined plane. The inclination of the plane is equal to the helix angle A of the threaded portion 7. The greater the helix angle A, the lower the force required to turn the collar 3, and the looser the collar 3 will be held in position on the inner leg 2. The normal force acting on the threaded portion 7 of the inner leg 2 is equal and opposite to the normal force acting on the threaded internal bore 6 of the collar 3. The external torque required for overcoming the frictional force F of the sliding decreases as the helix angle A increases.

The applied load V is the load which is to be supported by the telescopic prop 1. This applied load V is compressive in nature and induces compressive stress in the threaded portion 7.

Figure 3:
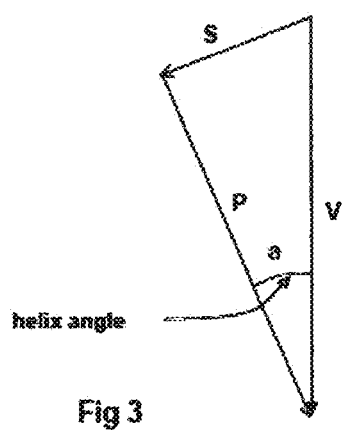
FIG. 3 shows a forces diagram outlining the components of the applied compression load V and the helix angle A within the threaded bore of the collar of the conventional telescopic prop of FIGS. 1 and 2.

The common interface between the threads of the threaded portion 7 and threaded internal bore 6 is subject to the applied load V. This applied load V may be resolved in component force P and component force S. Component force S drives the collar 3 down the inclined plane of the helix, and this force is counteracted by the frictional force F, generated by a reaction force R to component force P. Typically, frictional force F is greater than component force S and an external torque must be applied to rotate the collar 3. FIG. 3 shows the triangle of forces. As the helix angle A increases, component force S increases, whilst component force P, reaction force R and frictional force F decrease. Therefore at a specific helix angle A, the frictional force F is balanced by the component force S, and the striking collar 3 and inner member 2 are in equilibrium. This helix angle A is known at the critical helix angle A1 for a specific thread. For a helix angle A that is slightly less than the critical helix angle A1, only a very small torque would be required to rotate the collar 3 under applied load V. For a helix angle A greater than the critical helix angle A1 the collar 3 will rotate under the applied load V or under it's own weight. In conventional telescopic props 1 considerable torque is required to be applied to the collar 3 to rotate the collar 3 about the threaded portion 7 of the inner leg 2 under applied load V.

In practice, when determining the critical helix angle A1 for a specific thread, account must also be taken of the frictional force F at the interface between the collar 3 and the outer leg 4. The coefficient of friction will vary according to a number of other factors, such as surface condition, lubrication, material selection.

By determining the critical helix angle A1 for a specific threaded portion 7 and corresponding threaded internal bore 6, the ease with which the collar 3 can rotate can be ascertained. The torque or force required to strike such a collar 3 can be greatly minimised, since a significant proportion of this required force is supplied by the resultant force S of the applied load V. The force required to strike such a telescopic prop 1 can be significantly reduced, and in some cases no force could be required, and the collar 3 would self-strike under its own weight. Without any means of supporting the collar 3 in position on the inner leg 2, the collar 3 would strike when the applied load V reached a specific threshold, collapsing the telescopic prop 1 and releasing the load V being supported.

FIG. 2 shows the interaction between the three main elements of the prop 1 as shown in FIG. 1. The thread interface 8 is a section of the threaded bore 6 of the collar 3 threadedly engaged with the respective thread of the inner leg 2 and consider that all forces induced at the common interface between the threaded bore 6 of the collar 3 and the respective threaded portion 7 of the inner leg 2 are concentrated on the thread interface 8. As the main aspect of the discussion concerns the friction forces generated by reaction forces, as well as applied and resistive torques, it can be shown that, the assumption of all forces concentrated at thread interface 8 is a valid assumption in as much as friction is independent of area and hence friction forces may be assumed to act at a localized area such as at thread interface 8. Also, as all forces induced at the threads through the applied load V are substantially equidistant from the central longitudinal axis of the inner leg 2, the resistive torque produced by these forces or any torque applied at the collar 3 will be the same whether these forces are distributed throughout the common interface between the threaded portion 7 of the inner leg 2 and corresponding threaded bore 6 of the collar 3 or whether they are assumed to act at a localized area such as at thread interface 8.

Referring to FIG. 2 the applied load V is transferred to the thread interface 8 between the threaded bore 6 of the collar 3, and the threaded portion 7 of the inner leg 2. This load may be resolved in components 'P' and 'S'. Force 'S' tends to drive the collar 3 down the inclined plane of the helix and this is counteracted by the frictional force 'F' created by the reaction to 'P' i.e. 'R'. Conventionally, 'F' is greater than 'S' and an external torque needs to be applied to rotate the collar 3. Referring to FIG. 3, it can be seen from the triangle of forces that as the helix angle 'A' increases 'P', 'R' and 'F' decrease while 'S' increases. At a critical helix angle 'A1', frictional force 'F' is balanced by driven force 'S' and inner leg 2 and collar 3 are in equilibrium. For a helix angle A slightly less than 'A1' only a small torque is required to rotate the loaded collar 3 and for a helix angle A greater than 'A1' the collar 3 will rotate under the applied load V or under it's own weight.

FIGS. 4a, 4b and 4c show one embodiment of the load release means 15 in three different stages of the striking process. The inner member 12 comprises a threaded portion 17 that is externally threaded with a helix angle A which is close to or even greater than the critical helix angle A1. The inner member 12 may also comprise a second threaded portion 19, adjacent to the threaded portion 17. This second threaded portion 19 may form part of the inner member 12, or may comprise a second inner member secured to the inner member 12, not shown. The helix angle A of this second threaded portion 19 is smaller than the critical helix angle A1.

The striking collar 13 comprises a threaded internal bore 16 that corresponds with the threaded portion 17 of the inner member 12, such that the striking collar 13 can be threadedly engaged with the inner member 12, and rotate thereon. The striking collar 13 is secured in a desired position with a locking means 18. FIG. 4a shows a locking means 18 in the form of a retention collar 20 that is configured to threadedly engage with the second threaded portion 19. The retention collar 20 is configured to abut the striking collar 13. As the helix angle A of the second threaded portion 19 and therefore the corresponding second threaded internal bore 21, is less than the critical angle A1, the retention collar 20 acting as locking means 18 can prevent rotation of the striking collar 13, even when subjected to applied load V. The striking collar 13 will be sustained on the inner member 12.

To prepare the load release means 15 the striking collar 13 is rotated so that it is raised by a distance 'a', and is in the required position to support the applied load V. The retention collar 20 can then be rotated until the upper surface of the retention collar 20 is in contact with the lower face of the striking collar 13. Striking collar 13 is stable under any applied load V due to the locking means 18 provided by the retention collar 20. The retention collar 20 prevents rotation of the striking collar 13 under the applied load V and prevents self-striking when the locking means 18 is engaged.

As shown in FIG. 4b, to strike load V, the retention collar 20 must first be rotated away from striking collar 13.

Figure 5B:
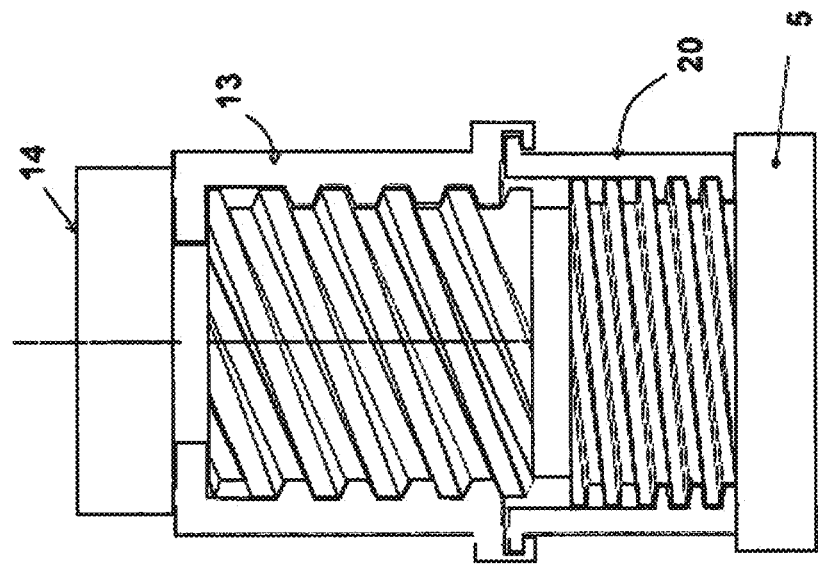
FIGS. 5a and 5b show one example of an embodiment of the load release means when a striking collar and a retaining collar are releasably secured to each other, shown supporting a load V (FIG. 5a) and having been struck (FIG. 5b)
Figure 5A:
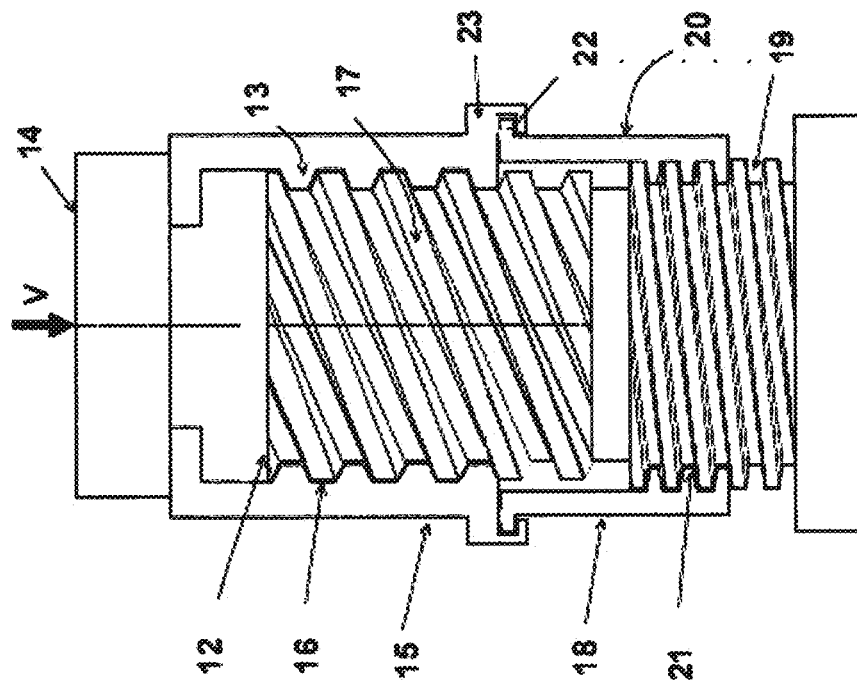

FIGS. 5a and 5b show a further arrangement of striking collar 13 and retention collar 20, whereby the striking collar 13 and retention collar 20 are suitably linked to each other. This means of releasably securing the striking collar 13 to the retention collar 20 may be through a continuous lip 22 that engages with a corresponding recess or groove 23. This may be formed by swaging or other means. The continuous lip 22 may be in the striking collar 13 and the corresponding groove within the retention collar 20, or vice versa. As shown in FIG. 5b, rotation of the retention collar 20 in such an arrangement would effectuate rotation of the striking collar 13. This arrangement of load release means 15 means that setting up the load release means 15 for loading, and striking the load release means 15 becomes a single operation.

FIGS. 6a and 6b show an embodiment of telescopic prop 1, showing the inner member 2, adjusting collar 3 and outer tube 4. The load release means 15 is added to the telescopic prop 1 as shown in FIG. 6b. The load release means 15 incorporates a bore that is larger than the outer diameter of the inner member 2 such that it may be positioned between the adjusting collar 3 and the outer tube 4 such that the outer tube 4 bears on the striking collar 13. The applied load V on the outer tube 4 is thereby passed onto the striking collar 13 and the inner member 2, enabling the striking collar 13 to be used for striking of the telescopic prop 1. This allows the load release means 15 to be retrofitted to existing telescopic props 1.

A further embodiment is shown in FIG. 7a where the striking collar 13 is integrated with and becomes part of the adjusting collar 24. In this arrangement the striking collar 13, retention collar 20 and adjusting collar 24 are releasably secured together to effectively form one unit. FIG. 7b shows an arrangement whereby the striking collar 13 is linked to the retention collar 20, to enable striking and set-up to be performed through one operation. Linking of striking collar 13 and retention collar 20 is done in the same manner as outlined above for FIG. 5b.

FIGS. 8a, 8b and 8c show a further embodiment where a compliant material 25 is positioned between the striking collar 13 and the retention collar 20. This compliant material 25 helps to avoid the transfer of the full applied load V onto the retention collar 20. The compliant material may comprise a spring washer as shown in the figures. The compliant material 25 may comprise a low friction material such as PTFE in addition to a spring washer, or may solely comprise a low friction material, without the spring washer.

The advantages of this arrangement in striking can now be seen. In the absence of compliant material item 25, and in the event that when preparing the device for loading, striking collar 13 was lifted by retention collar 20 the whole of the tolerance between the threads of striking collar 13 and the corresponding threads of inner leg 2, under compression load V, the maximum load on retention collar 20 would be 'V'. It follows that the angle of rotation of retention collar 20 to remove all load from striking collar 13 would be extremely small and once that rotation has taken place striking collar 13 would then be unloaded and may be rotated further freely, and under no load. To put this in perspective, the rotation of a conventional prop collar to release all load might be between 180 and 360 degrees or more, whereas even under the extreme condition of full load 'V' on retention collar 20, retention collar 20 may only need a rotation of 5 degrees or less to remove all load, and this may be achieved with a single impact torque load at the handles of retention collar 20.

If the compliant material 25 is incorporated, the load transferred to retention collar 20 will be less than applied load V and the magnitude of said transferred load will depend on the particular design parameters of the construct and stiffness of compliant material 25. Once retention collar 20 has been struck, i.e. lowered, striking collar 13 needs to be struck. However striking collar 13 is now made much easier because, as explained above, the large helix angle A of striking collar 13 ensures that the majority, if not all, of the torque required to strike striking collar 13 would be provided by the applied load 'V' itself. It can also be seen that, in any particular case, if the actual helix angle A of striking collar 13 is greater than the maximum critical helix angle A1, striking collar 13 will remain in contact with retention collar 20, as retention collar 20 is being struck. Depending on the relationship between the actual helix angle A of the inner member 12 and striking collar 13, striking collar 13 may strike with retention collar 20 or remain in position to be struck after retention collar 20.

Recent tests using cast iron prototypes confirmed the action and advantages of the load release means 15 of the described embodiments. The prototypes were designed to be used in conjunction with a current well known aluminium support system having a maximum allowable telescopic leg load of 140 kN. Current collars 3 have been invariably difficult to strike at high loads and tests at 130 kN load have shown torque requirements in excess of 650 Nm, typically 800 Nm and above, using properly treated cast iron collars with dry lubricants. 800 Nm translates to a force of 400 N (89 lb force) applied at the end of a 2.0 m spanner. Current cast iron prototypes using a helix angle A of 15 degrees, on the same inner legs 2, at 140 kN load can be struck quite easily with an external torque of less than 200 Nm. This can be improved further with a slightly higher helix angle A. Striking is gradual and fully controlled in all tests avoiding the sudden release of load V by conventional telescopic props 1.

In this specification, the word "comprise" has its normal dictionary meaning, to denote non-exclusive inclusion. That is, use of the word "comprise" (or any of its derivatives) to include one feature or more, does not exclude the possibility of also including further features.

All of the features enclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A load release device for a telescopic prop, the load release device comprising:
   an inner member with at least one threaded portion, said threaded portion comprising a helix angle A;
   a striking collar with a threaded internal bore configured to threadedly engage with the threaded portion of the inner member through a thread interface, said threaded bore also comprising the helix angle A, wherein the striking collar is configured to rotate relative to the inner member during striking; and
   a locking means to releasably secure said striking collar at a location along said inner member,
   whereby the helix angle A is substantially equal to a critical helix angle A1 such that, when the locking means is released, substantially no external torque is required to be applied to the striking collar to have the striking collar rotate relative to the inner member during striking.

2. A load release device according to claim 1, wherein the locking means comprises a retention collar with threaded internal bore configured to engage with a second threaded portion of the inner member, whereby, in use, the retention collar releasably secures the striking collar in position.

3. A load release device according to claim 2, wherein the striking collar and the retention collar are releasably joined to each other, whereby rotation of said retention collar rotates the striking collar on their respective threaded portions.

4. A load release device according to claim 3, wherein the striking collar incorporates at least one protrusion configured to engage with at least one recess in the retention collar at the interface between the striking collar and the retention collar.

5. A load release device according to claim 3, wherein the retention collar incorporates at least one protrusion configured to engage with at least one recess in the striking collar at the interface between the retention collar and the striking collar.

6. A load release device according to claim 4, wherein the at least one protrusion comprises a continuous lip, and the at least one recess comprises a continuous groove.

7. A load release device according to claim 1, wherein the threaded internal bore of the striking collar and corresponding threaded portion of the inner member comprise a multiple start thread.

8. A load release device according to claim 2, wherein the striking collar and the retention collar are separated by a compliant material.

9. A load release device according to claim 8, wherein the compliant material comprises at least one spring washer.

10. A load release device according to claim 2, wherein the striking collar and the retention collar are separated by a low friction material.

11. A load release device according to claim 10, wherein the low friction material is PTFE.

12. A load release device according to claim 9, wherein a compliant material is incorporated alongside the low friction material.

13. A load release device according to claim 1, wherein the striking collar incorporates at least one handle to facilitate rotation of said striking collar.

14. A load release device according to claim 2, wherein the retention collar incorporates at least one handle to facilitate rotation of said retention collar.

15. A load release device according to claim 1, wherein the striking collar incorporates at least one circumferential groove to support an outer member that is telescopically received on the striking collar, preventing separation under tension of said outer member to said striking collar.

16. A load release device according to claim 1, wherein the inner member comprises a threaded bore to threadedly engage with an inner leg of the telescopic prop.

17. A load release device according to claim 1, wherein the inner member comprises a tube with a diameter greater than the outer diameter of the inner leg of the telescopic prop for retrofitting on to an adjusting collar of the inner leg of the telescopic prop.

18. A telescopic prop incorporating the load release means of claim 1.

19. The load release device of claim 1 wherein, when the locking means is secured, the load is supported by the striking collar and locking means.

20. A load releasing device comprising:
   an inner member with at least one threaded portion, said threaded portion comprising a helix angle A;
   a striking collar with a threaded internal bore configured to threadedly engage with the threaded portion of the inner member through a thread interface, said threaded bore also comprising the helix angle A, wherein the striking collar is configured to rotate relative to the inner member during striking; and
   a lock to releasably secure said striking collar at a location along said inner member,
   whereby the helix angle A is substantially equal to a critical helix angle A1 such that, when the lock is released, substantially no external torque is required to be applied to the striking collar to have the striking collar rotate relative to the inner member during striking.

* * * * *